(12) United States Patent
Berhan

(10) Patent No.: US 6,720,696 B2
(45) Date of Patent: Apr. 13, 2004

(54) STARTER/GENERATOR AND A METHOD FOR MOUNTING A STARTER/GENERATOR WITHIN A VEHICLE

(75) Inventor: Michael Tekletsion Berhan, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,937

(22) Filed: Nov. 1, 2001

(65) Prior Publication Data

US 2003/0080637 A1 May 1, 2003

(51) Int. Cl.$^7$ ............................................. H02K 47/14
(52) U.S. Cl. ........................ 310/113; 310/59; 310/67 R
(58) Field of Search .............................. 310/67 R, 113, 310/75 R; 180/65.2

(56) References Cited

U.S. PATENT DOCUMENTS

| | | | |
|---|---|---|---|
| D36,678 S | 8/1903 | Strong et al. | |
| 4,203,710 A | 5/1980 | Farr | |
| 4,743,776 A | 5/1988 | Baehler et al. | |
| 4,830,412 A | 5/1989 | Raad et al. | |
| 4,862,009 A | 8/1989 | King | |
| 4,958,095 A * | 9/1990 | Uchida et al. | 310/59 |
| 5,001,412 A | 3/1991 | Carter et al. | |
| 5,097,140 A | 3/1992 | Crall | |
| 5,103,127 A * | 4/1992 | Peter | 310/113 |
| 5,337,867 A * | 8/1994 | Kirkwood | 192/3.29 |
| 5,418,400 A | 5/1995 | Stockton | |
| 5,427,196 A | 6/1995 | Yamaguchi et al. | |
| 5,497,041 A * | 3/1996 | Kondoh et al. | 715/534 |
| 5,513,719 A | 5/1996 | Moroto et al. | |
| 5,562,565 A | 10/1996 | Moroto et al. | |
| 5,691,588 A | 11/1997 | Lutz et al. | |
| 5,713,427 A | 2/1998 | Lutz et al. | |
| 5,760,487 A | 6/1998 | Kimura et al. | |
| 5,789,823 A | 8/1998 | Sherman | |
| 5,796,173 A | 8/1998 | Selfors et al. | |
| 5,831,341 A | 11/1998 | Selfors et al. | |
| 5,855,139 A | 1/1999 | Ohml et al. | |
| 5,893,423 A | 4/1999 | Selfors et al. | |
| 5,952,746 A | 9/1999 | Mittmann et al. | |
| 5,988,931 A | 11/1999 | Otwell | |
| 6,008,545 A | 12/1999 | Nagano et al. | |
| 6,040,634 A | 3/2000 | Larguier | |
| 6,133,659 A | 10/2000 | Rao | |
| 6,133,702 A | 10/2000 | Noble et al. | |
| 6,184,603 B1 * | 2/2001 | Hamai et al. | 310/75 R |
| 6,204,577 B1 | 3/2001 | Chottiner et al. | |
| 6,208,036 B1 | 3/2001 | Evans et al. | |
| 6,478,101 B1 * | 11/2002 | Taniguchi et al. | 180/65.2 |

FOREIGN PATENT DOCUMENTS

| | | | |
|---|---|---|---|
| EP | 0682194 A1 * | 11/1995 | |
| EP | 1008784 A2 * | 6/2000 | F16H/45/02 |
| JP | 9240307 A * | 9/1997 | |

* cited by examiner

*Primary Examiner*—Joseph Waks
(74) *Attorney, Agent, or Firm*—F. G. McKenzie; David B. Kelley

(57) ABSTRACT

A starter/generator assembly 10 which is adapted for use within a vehicle of the type having a crankshaft 12 and a torque converter 14. The assembly 10 includes a stator 18 and a rotor 20 which is isolated from the torque converter 14.

16 Claims, 6 Drawing Sheets

STARTER/GENERATOR AND A METHOD FOR MOUNTING A STARTER/GENERATOR WITHIN A VEHICLE

BACKGROUND OF INVENTION

1. Field of the Invention

The present invention generally relates to a starter/generator assembly and to a method for mounting a starter/generator assembly within a vehicle and more particularly, to a starter/generator assembly which is dynamically isolated and/or detached from the torque converter portion of the vehicle.

2. Background of the Invention

A starter/generator typically includes a stator and a selectively movable rotor which is in flux communication with the stator. The stator and rotor therefore cooperatively form a motor assembly and the assembly is typically employed within a hybrid electric vehicle to selectively cause an engine to be activated and to selectively generate electricity which is communicated to and stored by an electric battery which is resident within the vehicle. In order to reduce packaging and mounting requirements, the rotor is often mounted upon the torque converter of the vehicle and the stator is typically mounted to and operatively deployed within the case which houses the torque converter, thereby allowing the rotor to be in flux communication with the stator while reducing packaging requirements. While the foregoing arrangement does desirably reduce packaging requirements, it suffers from some drawbacks.

For example, a small gap is required to exist between the stator and the rotor in order to allow the flux communication to occur. Moreover, to allow optimal performance, the gap is required to have a certain size or width. At relatively high engine speeds, the torque converter tends to deform or balloon increasing the likelihood of causing the rotor to move toward the stator, thereby undesirably causing the air gap to shift or close and increasing the likelihood that the rotor will contact the stator, thereby degrading the overall performance of the motor assembly.

One strategy to overcome this difficulty requires the use of a relatively heavy and rigid rotor which is resistant to movement due to forces emanating from the torque converter. While this approach does overcome the foregoing drawbacks, it is relatively costly and undesirably increases the overall weight of the vehicle.

SUMMARY OF INVENTION

It is a first non-limiting advantage of the present invention to provide a starter/generator assembly which overcomes some or all of the previously delineated drawbacks of prior assemblies.

It is a second non-limiting advantage of the present invention to provide a method for mounting a starter/generator assembly within a vehicle in a manner which overcomes some or all of the previously delineated drawbacks of prior assemblies.

According to a first non-limiting aspect of the present invention, an assembly is provided for use in combination with a torque converter and a crankshaft. The assembly includes a stator; and a rotor which is coupled to the crankshaft, which is isolated from the torque converter, and which is in communication with the stator.

According to a second non-limiting aspect of the present invention, an assembly for use in combination with a crankshaft and a torque converter is provided. The assembly comprises a rotor which is coupled to the crankshaft; and a plate member which is disposed between the rotor and the torque converter and having an outer portion which is coupled to torque converter by the use of a fastener which is isolated from the rotor.

According to a third non-limiting aspect of the present invention, a method for mounting a motor within a vehicle of the type having a crankshaft and a torque converter which is housed within a case is provided. The method comprises the steps of mounting a first portion of the motor upon the crankshaft while causing the first portion to be isolated from the torque converter; and mounting a second portion of the motor upon the case, effective to allow the second portion of the motor to be in flux communication with the first portion.

These and other features, aspects, and advantages of the present invention will become apparent upon a reading of the following detailed description of the preferred embodiment of the invention and by reference to the following drawings.

DETAILED DESCRIPTION

Figure 1:
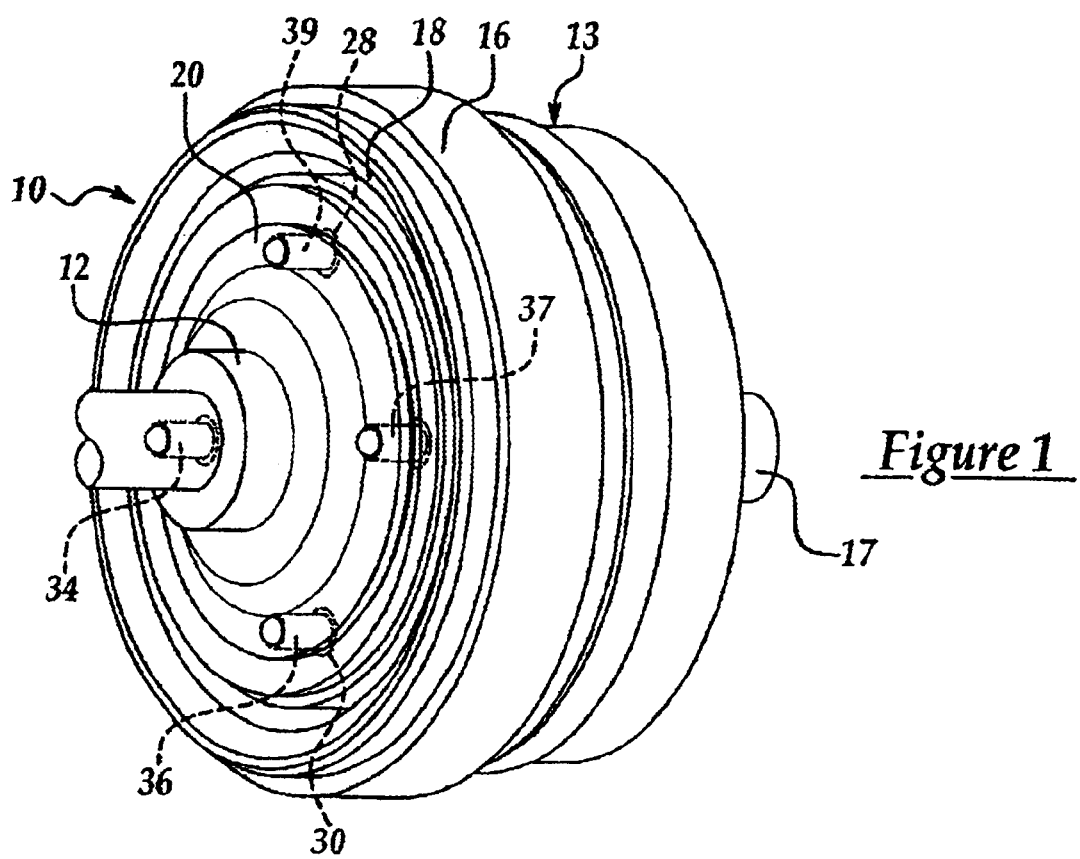
FIG. 1 is a perspective view of the starter/generator assembly of the preferred embodiment of the invention in assembled combination with a torque converter assembly and a crankshaft.
Figure 2:
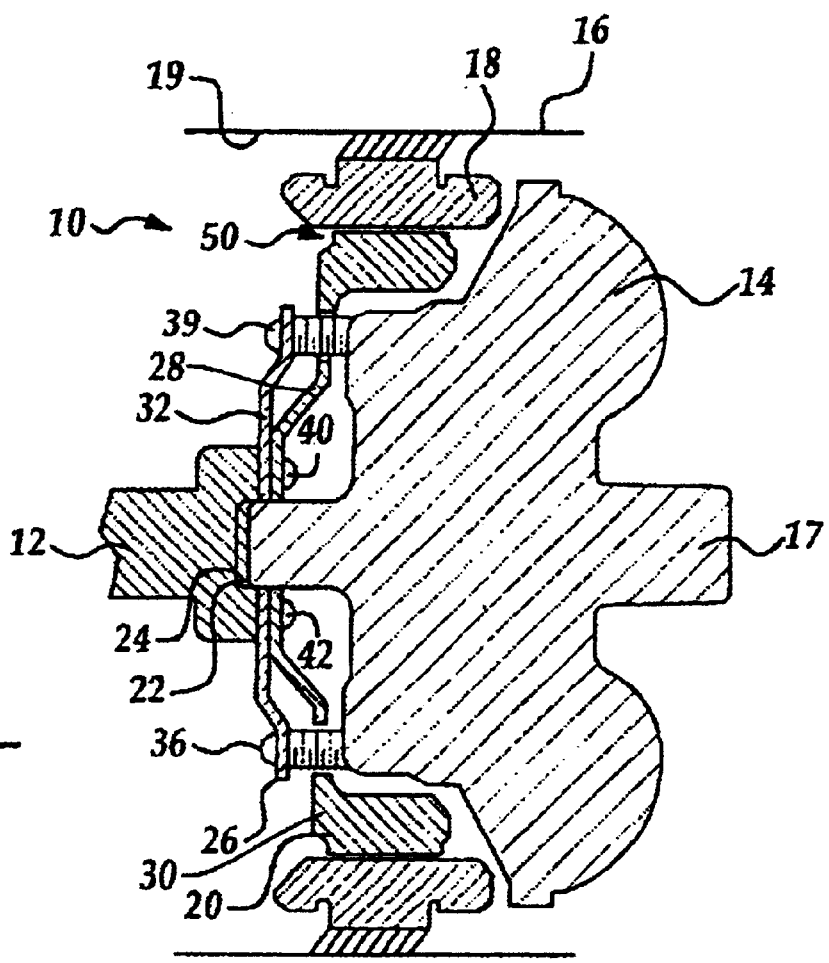
FIG. 2 is a side sectional view of the arrangement which is shown in FIG. 1.

Referring now to FIGS. 1, and 2, there is shown a starter/generator assembly 10 which is made in accordance with the teachings of the preferred embodiment of the invention and which is deployed within a vehicle of the type having a selectively rotatable crankshaft 12 and a torque converter assembly 13 including a torque converter 14 which is operatively contained within a housing or case 16 and which is coupled to or integrally formed with an output shaft 17.

As shown, the starter/generator assembly 10 includes a stator 18 which is mounted within the case 16 upon the interior surface 19 and a rotor 20 which is isolated from the torque converter 14 and which is separated from the stator 18 by an air gap 50. The term isolated, as used in this description, means that the axial and flexural movements of the torque converter 14 are not substantially transmitted or communicated to the rotor 20. In one non-limiting embodiment, the rotor 20 is physically detached or separated from the torque converter 14 in order to achieve the desired isolation. However such desired isolation may also or alternatively be achieved by the use of isolation (e.g., energy absorbing) members or by a variety of other strategies and nothing in this application is meant to limit the isolation aspects of the present invention to the strategy of physically separating or detaching the rotor 20 from the torque converter 14.

Particularly, in one non-limiting embodiment, the rotor 20 includes a central portion or hub 22 which is received within the central portion 24 of the crankshaft 12 and an outer portion 26 having a plurality of substantially identical and generally circular apertures, such as apparatus 28, 30, which are substantially and equidistantly positioned from the central hub 22. The rotor 20 is in flux communication with the stator 18 through the air gap 50. In another non-limiting embodiment, the rotor 20 does not include a central hub 22. Rather, the hub 22 is replaced with an aperture as best shown in FIG. 5.

Further, assembly 10 includes a flexible plate member 32 which is coupled on the torque converter 14 by the use of a plurality of substantially identical fastener members 34, 36, 37, 39 each of which traverses a unique one of the rotor apertures, such as 28, 30, thereby physically isolating or decoupling the rotor 20 from the torque converter 14 since the respective diameters of each of the rotor apertures, such as apertures 28, 30, are substantially larger than the respective diameters of each of the fasteners 34, 36, 37, 39. Further, the rotor 20 is coupled to the crankshaft 12 by the use of a plurality of substantially identical fastener members, such as members 40, 42, each of which traverse the plate member 32. In one non-limiting embodiment, fasteners 34, 36, 37, 39, 40 and 42 are substantially identical. In another non-limiting embodiment rotor 20 and plate 32 may be integrally formed or coupled by other types of fasteners, thereby obviating the need for fasteners 40, 42 to traverse the plate member 32. Alternatively, the rotor 20 and plate 32 may be interlocked.

In this manner, the assembly 10 is efficiently packaged or mounted within the vehicle and further, the decoupling, disconnection, and/or isolation of the rotor 20 from the torque converter 14 substantially reduces the likelihood that the torque converter 14 will cause the rotor 20 to undesirably touch the stator 18 or close and/or shift the air gap 50 since the forces emanating from the torque converter 14 are not readily communicated to the rotor 20 due to the absence of a path, member, or a series or collection of members which physically couple the rotor 20 to the torque converter 14. Hence, the large or oversized apertures, such as apertures 28, 30, dynamically isolate the rotor 20 from the torque converter 14.

Figure 3:
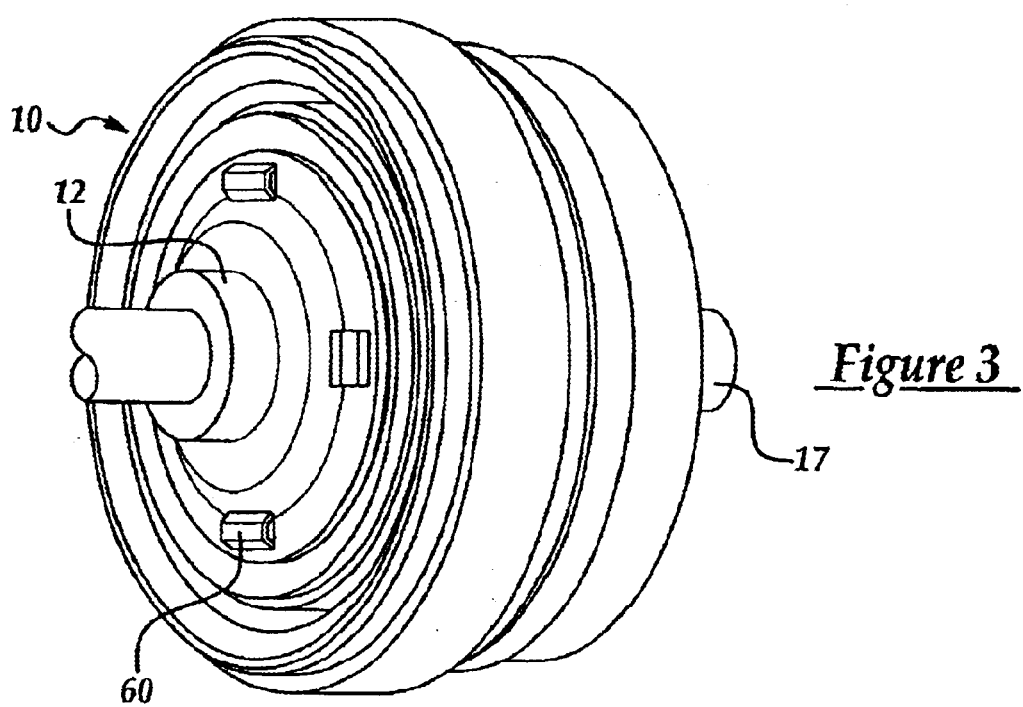
FIG. 3 is a perspective view of a starter/generator assembly which is made in accordance with the teachings of a second embodiment of the invention in assembled combination with a torque converter assembly and a crankshaft.
Figure 4:
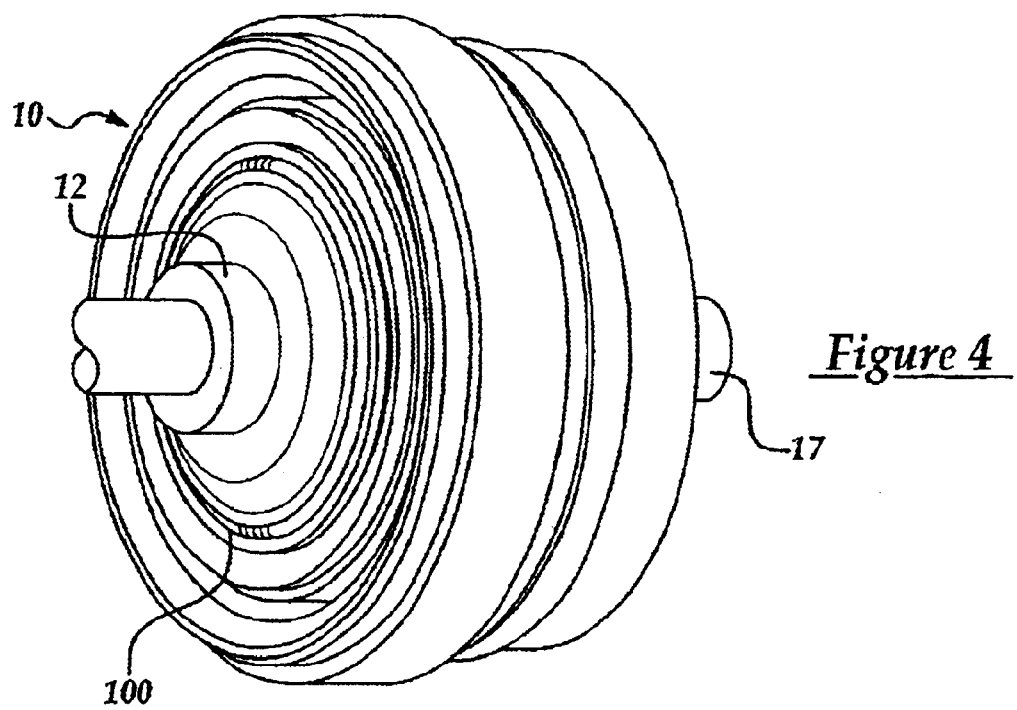
FIG. 4 is a perspective view of a starter/generator assembly which is made in accordance with the teachings of a third embodiment of the invention in assembled combination with a torque converter assembly and a crankshaft.
Figure 5:
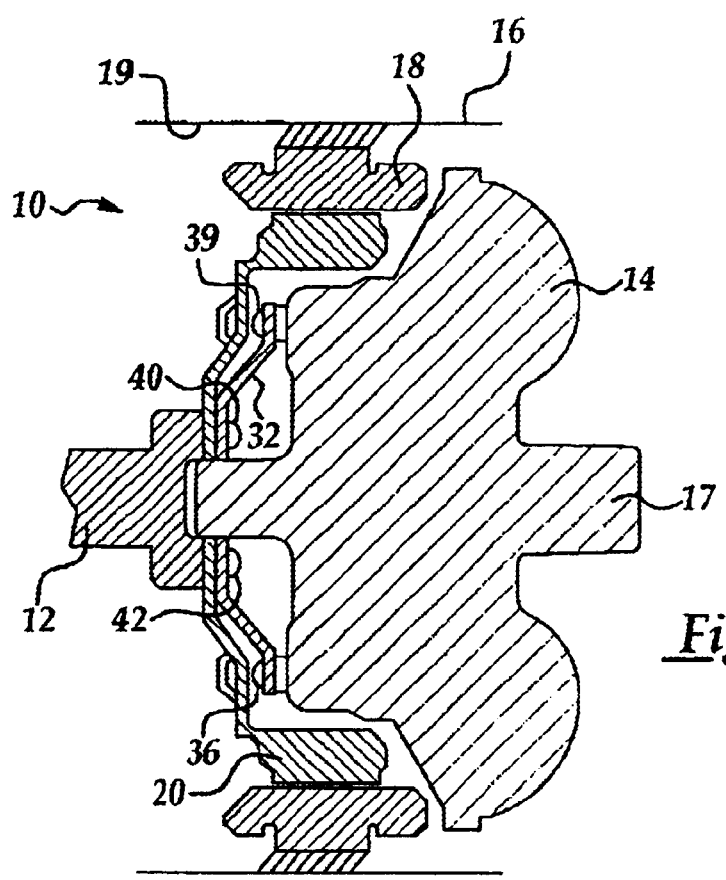
FIG. 5 is a side sectional view of the arrangement which is shown in FIG. 3.

In a second non-limiting embodiment, as shown best in FIGS. 3 and 5, the fastener members 34, 36, 37 and 39 do not traverse the rotor 20. Rather, the members 34–39 directly and physically connect the flexible plate 32 to the torque converter 14. The rotor 20 and the flexible plate member 32 are each coupled to the crankshaft 12 by fastener members, such as members 40, 42, in substantially the same manner as previously discussed with respect to FIGS. 1 and 2. Moreover, the rotor 20 is again positioned between the crankshaft 12 and the flexible plate member 32, and the rotor 20 is again physically detached and isolated from the torque converter 14 and therefore the movement of the torque converter 14 is substantially prevented from being communicated to the rotor 20. Particularly, in this non-limiting embodiment, such isolation is accomplished by outwardly protruding pockets 60 which are formed in the rotor 20 (the term outwardly protruding means outwardly bulging or extending in a direction toward the crankshaft 12). That is, each pocket 60 is generally cup shaped or cupped and overlays a unique one of the fasteners 34–39 while respectively providing space or clearance for the fasteners 34–39 to move in the direction toward the crankshaft 12, thereby allowing the fasteners 34–39 to move without impacting the rotor 20. In yet another non-limiting embodiment of the invention the discrete pockets 60 are replaced with an outwardly protruding and continuous ring 100 which is shown best in FIG. 4 and which provides substantially the same space or clearance to the fastener members 34–39.

Figure 6:
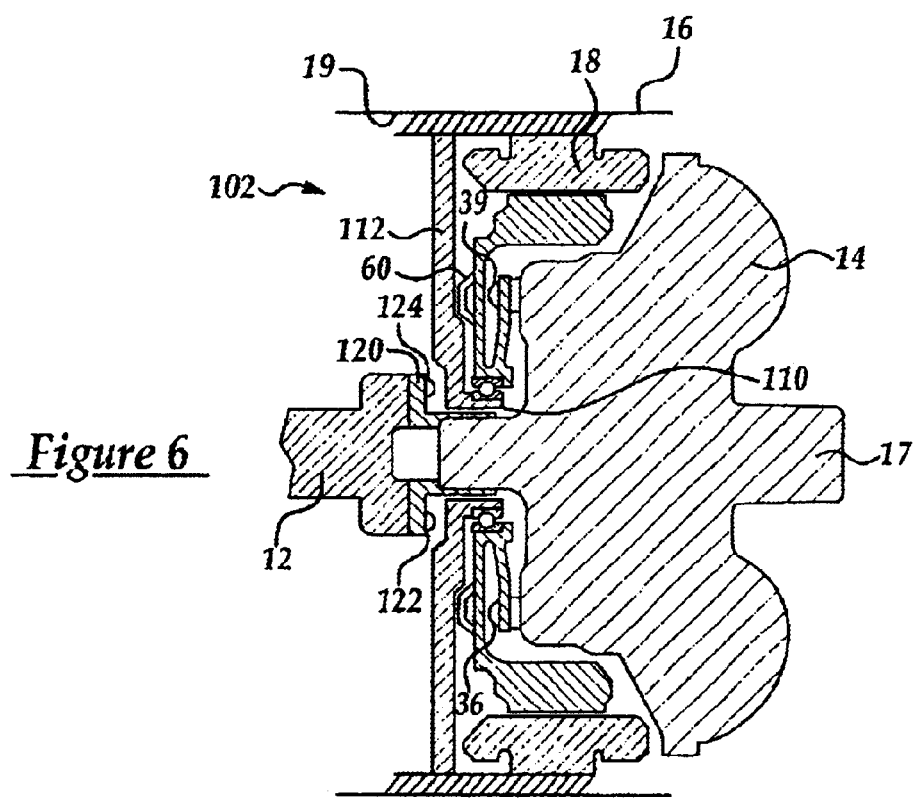
FIG. 6 is a side sectional view of a starter/generator assembly which is made in accordance with the teachings of a fourth embodiment of the invention in assembled combination with a torque converter assembly and a crankshaft.

Referring now to FIG. 6, there is shown yet another non-limiting embodiment of a stator/generator assembly 102 of the invention. Particularly, in this non-limiting embodiment, a rotor 20 having pockets 60 is attached to the torque converter 14 by the use of fasteners 34, 36, 37 and 39. As previously delineated, each pocket 60 overlays a unique one of the fasteners 34, 36, 37, 39 and outwardly protrudes, thereby providing clearance or space for these fasteners 34, 36, 37, 39 to move within without impacting the rotor 20. In this manner, the fasteners 34, 36, 37, and 39 are dynamically isolated from the rotor 20. Further, a bearing 110 is provided and is coupled to the torque converter 14 and to a support plate 112 which is coupled to the interior surface 19 of the case 16. The crankshaft 12 is coupled to the torque converter 14 by use of drive hub 120, and fasteners 122, 124. In another non-limiting embodiment, drive hub 120 is removed and crankshaft 12 may be directly coupled to torque converter 14. In another non-limiting and alternative embodiment, the rotor 20 may have a protruding ring 100, thereby obviating the need for pockets 60.

In this embodiment, the axial movement of the torque converter 14 is communicated to the bearing 110 and the bearing support member 112 without applied to the rotor 20, thereby isolating the rotor 20 from movement type forces generated by the torque converter 14, effective to allow a more precise positioning of the rotor 20 during operation because the structural path between the rotor 20 and the stator 18 is much shorter than in previous designs and the path traverses fewer components. In this manner, the path between the rotor 20 and the stator 18 is structurally stiffer than in previous designs and less dependent upon manufacturing variations of components through which the path traverses.

It is to be understood that invention is not limited to the exact construction or method which has been delineated above, but that various changes and modifications may be made without departing from the spirit and the scope of the inventions as are further delineated within the following claims.

What is claimed is:

1. An assembly for use in combination with a torque converter and a crankshaft, said assembly comprising a stator, a rotor which is coupled to said crankshaft, which rotor is mechanically isolated from said torque converter, and which rotor is in flux communication with said stator; a flexible plate member which is coupled to said crankshaft; and a plurality of fastening members which are coupled to said flexible plate member and to said torque converter and which fastening members traverse said rotor.

2. The assembly of claim 1 wherein said rotor includes a central hub portion which is received by said crankshaft and wherein said assembly further includes at least a second fastener which couples said central hub portion to said crankshaft.

3. The assembly of claim 1 wherein said at least one fastening member has certain diameter and wherein said rotor has an aperture which is substantially larger than said certain diameter through which said at least one fastening member passes.

4. The assembly of claim 1 wherein said assembly further comprises a flexible plate member which is coupled to said crankshaft; at least one fastener which is coupled to said flexible plate member and to said torque converter, and wherein said rotor includes an outwardly protruding pocket which overlays said at least one fastener.

5. The assembly of claim 1 wherein said assembly further comprises a flexible plate member which is coupled to said crankshaft; at least one fastener which is coupled to said flexible plate member and to said torque converter, and wherein said rotor includes an outwardly protruding ring which overlays said at least one fastener.

6. The assembly of claim 1 wherein said assembly further comprises a case containing the torque converter, a flexible plate member which is coupled to said crankshaft, at least one fastener which is coupled to said flexible plate member and the said torque converter; a bearing support member which is disposed within said case; and a bearing which is coupled to said bearing support member and to said rotor.

7. The assembly of claim 6 wherein said rotor includes an outwardly protruding pocket which overlays said at least one fastener.

8. The assembly of claim 6 wherein said rotor includes an outwardly protruding ring which overlays said at least one fastener.

9. The assembly of claim 7 wherein said outwardly protruding pocket is cup.

10. An assembly for use in combination with a crankshaft and a torque converter, said assembly comprising a rotor which is coupled to said crankshaft and includes at least one outwardly protruding ring; and a plate member which disposed between said rotor and said torque converter and having an outer portion which is coupled to torque converter by the use of a fastener which is mechanically isolated from said rotor.

11. The assembly of claim 10 wherein said rotor is mechanically isolated from said torque converter.

12. The assembly of claim 10 wherein said rotor is detached from said torque converter.

13. The assembly of claim 10 further comprising at least one fastening member which is coupled to said plate member and to said torque converter.

14. An assembly for use in combination with a crankshaft and a torque converter, said assembly comprising a rotor which is coupled to said crankshaft; wherein said rotor includes at least one outwardly protruding pocket; and a plate member which disposed between said rotor and said torque converter and having an outer portion which is coupled to the torque converter by the use of a fastener which is mechanically isolated from said rotor.

15. The assembly of claim 14 wherein said rotor is mechanically isolated from said torque converter.

16. The assembly of claim 14 further comprising at least one fastening member which is coupled to said plate member and to said torque converter.

* * * * *